(12) United States Patent
Korneluk et al.

(10) Patent No.: US 10,165,410 B2
(45) Date of Patent: *Dec. 25, 2018

(54) METHOD AND MOBILE TRANSCEIVER FOR ASSET TRACKING (71) Applicant: BlackBerry Limited, Waterloo (CA)

(72) Inventors: José Eduardo Korneluk, Lake Worth, FL (US); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,296

(22) Filed: Oct. 2, 2017

(65) Prior Publication Data

US 2018/0027378 A1 Jan. 25, 2018

Related U.S. Application Data (63) Continuation of application No. 14/987,592, filed on Jan. 4, 2016, now Pat. No. 9,781,568.

(51) Int. Cl.
*H04W 24/00* (2009.01)
*H04W 4/02* (2018.01)
(Continued)

(52) U.S. Cl.
CPC ............ *H04W 4/025* (2013.01); *G01S 19/03* (2013.01); *H04W 4/80* (2018.02); *H04W 36/14* (2013.01); *H04W 48/16* (2013.01); *H04W 84/042* (2013.01); *H04W 84/12* (2013.01); *H04W 88/06* (2013.01); *Y02D 70/1224* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/166* (2018.01)

(58) Field of Classification Search
CPC ........... H04W 4/02; H04W 4/12; H04W 4/14; H04W 64/00
USPC .......................................... 455/456.1, 456.2
See application file for complete search history.

(56) References Cited

U.S. PATENT DOCUMENTS 7,936,708 B2  5/2011 Kesavan
2007/0165555 A1  7/2007 Deng
(Continued)

FOREIGN PATENT DOCUMENTS

EP          1877821        7/2010
WO    WO 2015044505      4/2015

OTHER PUBLICATIONS

International Search Report and Written Opinion; PCT/CA2016/051525; dated Mar. 22, 2017.

*Primary Examiner* — Temica M Beamer
(74) *Attorney, Agent, or Firm* — Ridout and Maybee LLP (57) ABSTRACT

A method and mobile transceiver for asset tracking is provided. In one aspect, a method of operating a mobile transceiver comprising a processor, a memory, a satellite receiver, and at least one wireless transceiver is provided. The method comprises activating a wireless transceiver associated with a last used wireless service from a low power mode, searching for a wireless signal for the last used wireless service, and selecting an alternate wireless service when the last used wireless service is not available. Different approaches for selecting the alternate wireless service are provided.

18 Claims, 5 Drawing Sheets

(51) Int. Cl.
  *H04W 48/16*  (2009.01)
  *H04W 36/14*  (2009.01)
  *G01S 19/03*  (2010.01)
  *H04W 4/80*   (2018.01)
  H04W 88/06    (2009.01)
  H04W 84/04    (2009.01)
  H04W 84/12    (2009.01)

(56) References Cited

U.S. PATENT DOCUMENTS

| | | | |
|---|---|---|---|
| 2011/0090041 A1* | 4/2011 | Naden | G01S 5/0027 |
| | | | 340/3.1 |
| 2011/0195712 A1* | 8/2011 | Mucke | H04W 48/16 |
| | | | 455/434 |
| 2011/0260858 A1 | 10/2011 | Eruchimovitch et al. | |
| 2014/0357271 A1* | 12/2014 | Edara | H04W 52/0254 |
| | | | 455/434 |

* cited by examiner

METHOD AND MOBILE TRANSCEIVER FOR ASSET TRACKING

CROSS-REFERENCE TO RELATED APPLICATIONS

The present application is a continuation U.S. patent application Ser. No. 14/987,592, filed Jan. 4, 2016, the content of which is incorporated herein by reference in its entirety.

TECHNICAL FIELD

The present disclosure relates generally to mobile transceivers, and more specifically, to a method and mobile transceiver for asset tracking.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. Examples of types of GNSS tracking devices include: a data logger, a data pusher and a data puller. A data logger may store the measured location data in internal memory for subsequent download and analysis. A data pusher (also known as a beacon) may send location data stored in internal memory to a server or other device in accordance with predefined parameters. A data puller (also known as a transponder) may store location data in internal memory and provides the location data in response to queries from a server or other device. GNSS tracking devices may have limited power and/or limited processing resources. Accordingly, methods of efficiently operating and deploying GNSS tracking devices may be desirable.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that may allow global and long-range tracking applications in which an asset in global and long-range transit can be tracked even though it crosses wireless carrier and network coverage boundaries while in transit. In global and long-range tracking applications the mobile transceiver and the asset being tracked may cross wireless carrier and network coverage boundaries while in transit. For example, it is not uncommon for a shipping container to originate in mainland China and travel around South Africa with a final destination in North America. The mobile transceiver of the present disclosure includes one or more wireless transceivers which may allow the mobile transceiver to communicate using one of a number of wireless services, such as 4G LTE, 3G, 2G, WLAN/Wi-Fi and/or Bluetooth, etc. to account for the various wireless services that may be available at any time while in transit.

The present disclosure also provides methods of operating the mobile transceiver (e.g., tracking device) for global and long-range tracking that is power efficient and that extends the expected life of the battery of the mobile transceiver. When the mobile transceiver wakes up after a period of inactivity, the wireless service that was last used to report location may no longer be available. Additionally, if crossing continental boundaries and international borders, the wireless access technology and RF bands typically do not overlap. The present disclosure provides methods of operating a mobile transceiver which, among other things, select a wireless service for communicating logged data to an asset tracking service using minimal power, thereby extending the expected life of the battery of the mobile transceiver. This is particularly advantageous when the mobile transceiver is provided with a non-rechargeable battery.

In accordance with various embodiments, the mobile transceiver determines a last used wireless service and attempts to access the last used wireless service, thereby saving battery power associated with searching for all the available wireless services is conventionally done. When the last used wireless service is not available, different approaches for selecting and switching to an alternate wireless service may be taken. When the last used wireless service is available, the mobile transceiver may access the last used wireless service and receive a command from the asset tracking service to switch to an alternate wireless service which may be preferred or more optimal for power related or other reasons.

In accordance with an example embodiment of one aspect of the present disclosure, there is provided a method of operating a mobile transceiver, the mobile transceiver comprising a processor, a memory, a satellite receiver, and at least one wireless transceiver, the method comprising: activating a wireless transceiver associated with a last used wireless service from a low power mode; searching for a wireless signal for the last used wireless service; when the last wireless service is available, accessing the last used wireless service, and sending at least a portion of a data log to an asset tracking service using the last used wireless service; and when the last used wireless service is not available, selecting an alternate wireless service from a plurality of wireless services, accessing the alternate wireless service, updating a last used wireless service in memory, and sending at least a portion of the data log to the asset tracking service using the alternate wireless service.

In accordance with an example embodiment of another aspect of the present disclosure, there is provided a mobile transceiver, comprising: a processor; a memory coupled to the processor; a satellite receiver coupled to the processor; and a wireless transceiver coupled to the processor; wherein the processor is configured for: activating a wireless transceiver associated with a last used wireless service from a low power mode; causing the wireless transceiver to search for a wireless signal for the last used wireless service; when the last wireless service is available, accessing the last used wireless service, and sending at least a portion of a data log to an asset tracking service using the last used wireless service; and when the last used wireless service is not available, selecting an alternate wireless service from a plurality of wireless services, accessing the alternate wireless service, updating a last used wireless service in memory, and sending at least a portion of the data log to the asset tracking service using the alternate wireless service.

In accordance with an example embodiment of a further aspect of the present disclosure, there is provided a non-transitory machine readable medium having tangibly stored thereon executable instructions that, when executed by a processor of a mobile transceiver, the mobile transceiver comprising a processor, a memory, a satellite receiver, and at least one wireless transceiver, cause the processor to: activating a wireless transceiver associated with a last used wireless service from a low power mode; causing the wireless transceiver to search for a wireless signal for the last used wireless service; when the last wireless service is available, accessing the last used wireless service, and sending at least a portion of a data log to an asset tracking service using the last used wireless service; and when the last used wireless service is not available, selecting an alternate wireless service from a plurality of wireless services, accessing the alternate wireless service, updating a last used wireless service in memory, and sending at least a portion of the data log to the asset tracking service using the alternate wireless service.

Figure 1:
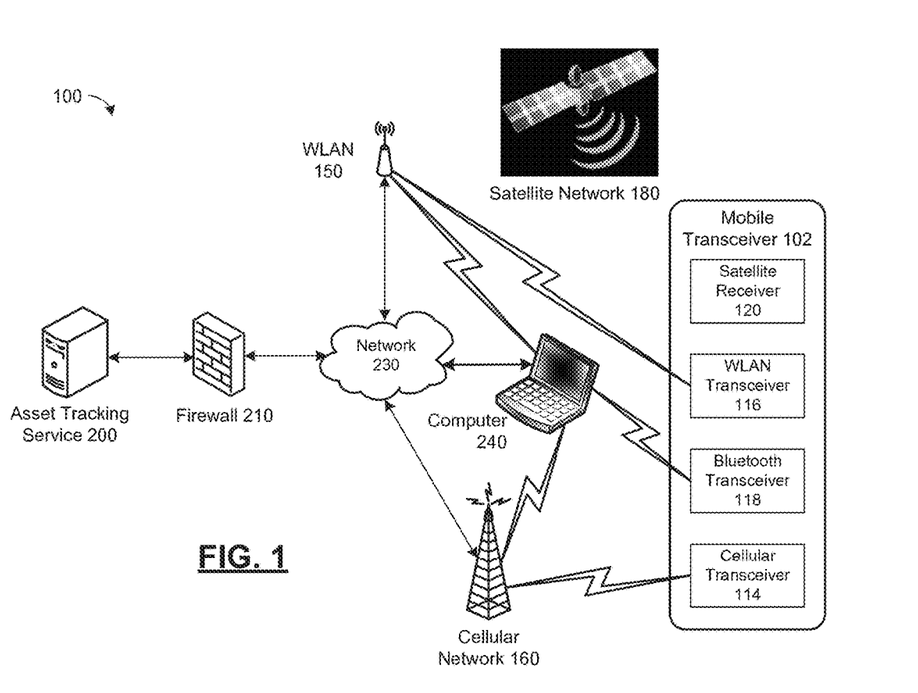
FIG. 1 is a block diagram illustrating a communication system suitable for operating a mobile transceiver in accordance with the present disclosure.
Figure 2:
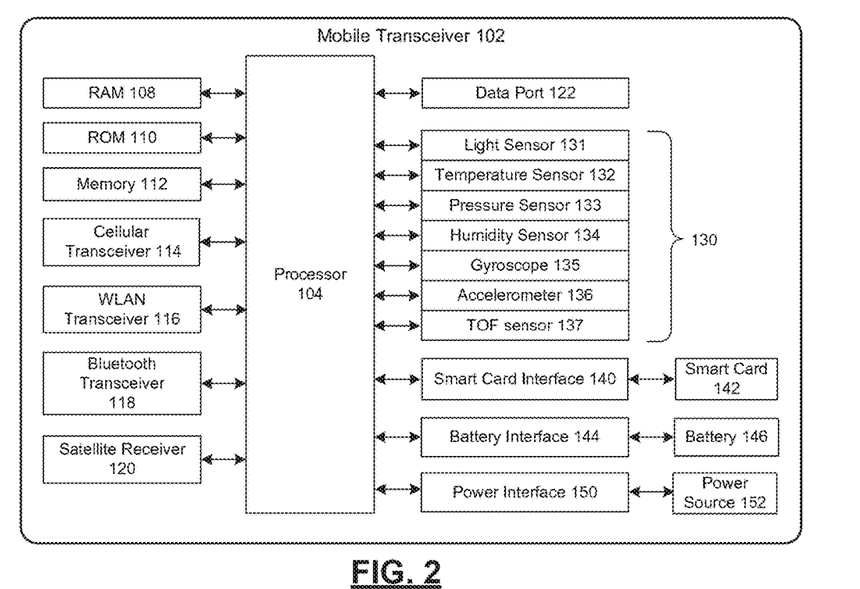
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), and a plurality of environmental sensors 130 for sensing the environment of the mobile transceiver 102. The sensors 130 may comprise a light sensor 131, temperature sensor 132, pressure sensor 133, humidity sensor 134, gyroscope 135, accelerometer 136, one or more time-of-flight (ToF) sensors 137 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computer 240. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The SIM card includes subscriber identity data (also referred to as SIM data) includes information necessary to obtain access to a wireless voice and/or data network provided, for example, by a wireless network service provider, depending on the embodiment. The subscriber identity data may include network operator bundle information and/or user data information. Examples of network operator bundle information and/or user data information may include subscriber identification information, network selection parameters, network operator data and application data for accessing various data services, etc. In one embodiment, the subscriber identity data comprises subscriber identification information, network selection parameters, and network operator data (sometimes referred to as "network credentials"). In other embodiments, the subscriber identity may include more or less information. For example, in some embodiments, the subscriber identity data may further comprise application data.

Examples of subscriber identification information may include, without limitation, International Mobile Subscriber Identity (IMSI), Integrated Circuit Card ID (ICCID), Temporary Mobile Subscriber Identity (TMSI), Packet TMSI (P-TMSI), and Mobile Subscriber Integrated Services Digital Network Number (MSISDN). Example network selection parameters include, without limitation, Public Land Mobile Network Selector (PLMNSel), Forbidden PLMN (FPLMN), and Home PLMN (HPLMN). Examples of network operator data include, without limitation, Operator controlled PLMN (OPLMN) list SPN (Service Provider Name), PLMN Network Name (PNN) for name display, Emergency Control Center (ECC) for emergency calls, and other call categories, etc. Examples of application data include, without limitation, the SIM Application Toolkit (STK) (e.g., Roaming Broker, Enhanced Network Selection (ENS), International Mobile Equipment Identity (IMEI) change applications, etc.)

In some embodiments, the subscriber identity data may further comprise authentication information, such as keys, and encryption algorithms, etc. For example, authentication information may comprise an authentication key (Ki) and the encryption algorithms described in 3GPP TS 35.205 V9.0.0 published Dec. 31, 2009 and entitled "Specification of the MILENAGE Algorithm Set: An example algorithm set for the 3GPP authentication and key generation functions f1, f1*, f2, f3, f4, f5 and f5*", the disclosure of which is hereby incorporated by reference in its entirety.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service.

The mobile transceiver 102 may also include a power interface, such as a power port, for connecting to an external power source 152 such as an alternating current (AC) power adapter. The mobile transceiver 102 can use the external power source 152 rather than the battery 146. If the battery 146 is rechargeable, the external power source 152 may be used to recharge the battery 146.

Referring again to FIG. 1, an example communication system 100 in which a mobile transceiver 102 of the present disclosure can operate will be described. The mobile transceiver 102 typically uses the cellular network 160 to access an asset tracking service (e.g., a server or fleet management system) 200. The asset tracking service 200 may be implemented as one or more server modules and is typically located behind a firewall 210. The asset tracking service 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking service 200 such that no hardware or configuration information is necessary to access the functionality other than the API location and functional definitions.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location at regular intervals, in accordance with a predefined schedule, or in response to a trigger event, among other possibilities. The frequency or schedule at which the location is determined may be fixed or configurable. The mobile transceiver 102 stores the determined location, typically in terms of Latitude and Longitude, and a time at which the location was determined in a data log stored in the memory 112 of the mobile transceiver 102. Thus, the data log provides an asset tracking log.

The mobile transceiver 102 may also use one or more of the sensors 130 to sense or measure an environment of the mobile transceiver 102. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log), which is stored in the memory 112. As with the location data, the mobile transceiver 102 may collect sensor data at regular intervals, in accordance with a predefined schedule, or in response to a trigger event, among other possibilities. The frequency or schedule at which sensor data is obtained may be fixed or configurable.

The mobile transceiver 102 attempts to connect to the asset tracking service 200 to report location and/or sensor data stored in the asset tracking log at regular intervals, in accordance with a predefined schedule, or in response to a trigger event, among other possibilities. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

Figure 3:
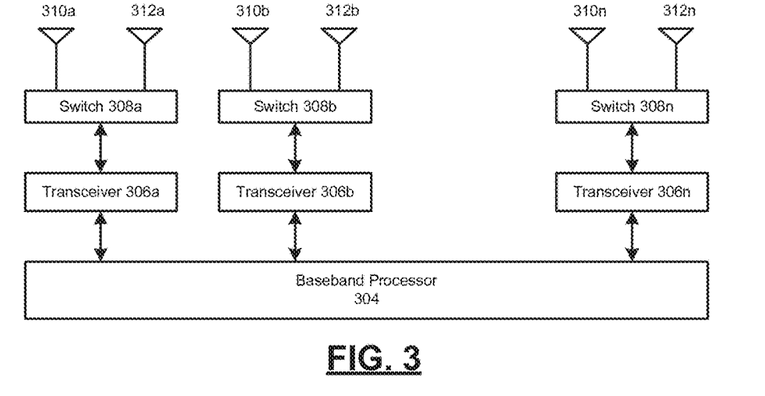
FIG. 3 is a block diagram illustrating a wireless communication subsystem in accordance with an example embodiment of the present disclosure.

In some embodiments, more than one SIM card may be carried by the mobile transceiver 102 for a particular cellular transceiver 114. For example, when the mobile transceiver 102 has a multi-band cellular transceiver 114, two or more SIM cards may be provided with each SIM card being associated with a different wireless service provider. Each SIM card may be preferred for particular geographical regions, for example, based on the wireless service providers in those geographical regions. The cellular transceiver module may include a switch (not shown) may be used to switch between the SIM cards for the particular cellular transceiver 114, or a dedicated switch may be provided. In other embodiments, virtual SIM cards may be provided rather than physical SIM cards. A virtual SIM card is a data object stored in memory, such as the memory 112, which includes the subscriber identity data normally stored on a physical SIM card, emulating a physical SIM card. When virtual SIM cards are provided, the switching is done via software by the transceiver module or baseband processor 304.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and need not coincide, although the cycles typically overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306*a*, 306*b*, . . . 306*n*. Each of the wireless transceivers/receivers 306 is coupled to a switch 308, represented individually by references 308*a*, 308*b*, . . . 308*n*, which is coupled to an internal antenna 310, represented individually by references 310*a*, 310*b*, . . . 310*n*, and an external antenna 312, represented individually by references 312*a*, 312*b*, . . . 312*n*. The external antennas 312 typically serve as the primary antennas because of the reduced RF interference associated with being located outside of the shipping container 400, whereas the internal antennas 310 typically serve as secondary antennas because of the increased RF interference associated with being located inside of the shipping container 400.

It at least some embodiments, the external antennas 312 are provided in a common external antenna module, and a ground pin of the external antenna module is connected to a general-purpose input/output (GPIO) pin of the processor 104 which can be monitored, for example, when the mobile transceiver 102 wakes up. When the ground pin of the external antenna module is not detected, this is an indication that the external antenna module is disconnected, an electronic malfunction has occurred in the external antenna module, or the external antenna 312 and/or the external housing module 504 has been otherwise damaged or tampered with. In other embodiments, a ground pin of each external antenna 312 may be individually connected to a GPIO pin of the processor 104.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

The terms "switch" and "switching" used in the described embodiments are not intended to be restricted to changing the active antenna. Instead, the terms are intended to include instructing a respective switch 308 to make a particular antenna the active antenna if the particular antenna is not already the active antenna.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

Figure 4:
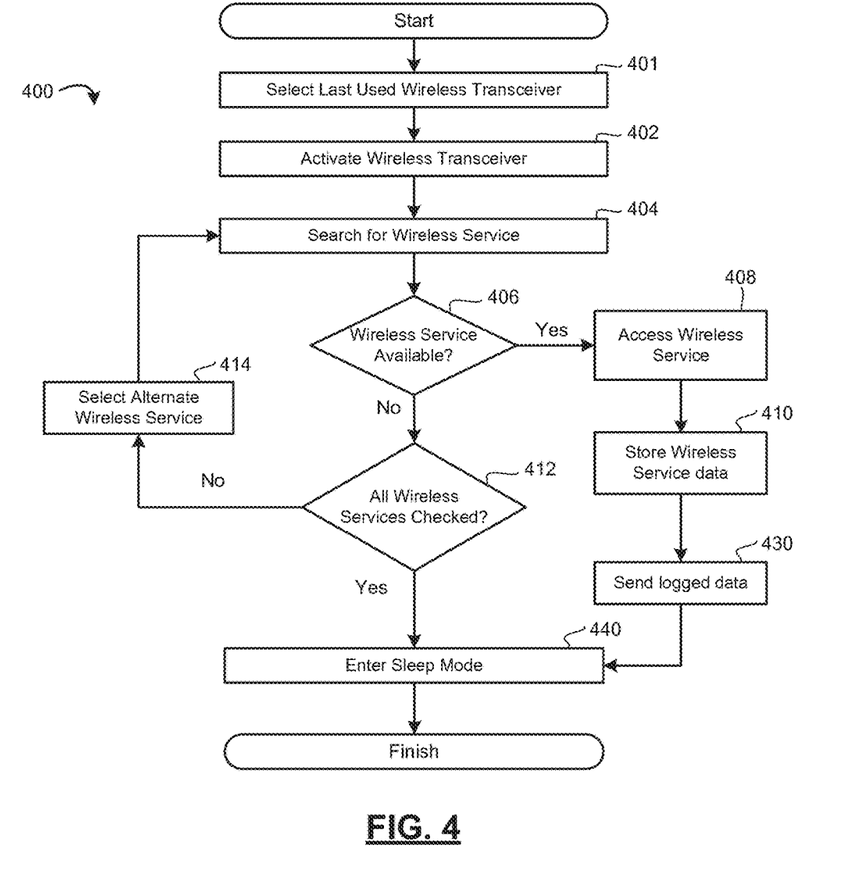
FIG. 4 is a flowchart illustrating an example embodiment of a method of operating a mobile transceiver in accordance with one embodiment of the present disclosure.

FIG. 4 shows an example flowchart of a method 400 of operating a mobile transceiver 102 such as a GNSS tracking device in accordance with one example embodiment of the present disclosure. The method may be carried out by software executed by a processor of the mobile transceiver 102. Coding of software for carrying out such a method 400 is within the scope of a person of ordinary skill in the art provided the present disclosure. The method 400 may contain additional or fewer processes than shown and/or described, and may be performed in a different order in other embodiments. Machine readable code executable by the processor to perform the method 400 may be stored in a machine readable medium such as a memory of the mobile transceiver 102.

At 401, the mobile transceiver 102 determines and selects a last used wireless service, such as a 4G LTE, 3G, 2G, or possibly WLAN or Bluetooth wireless service. When more than one wireless transceiver is carried by the mobile transceiver 102, a last used wireless transceiver associated with the last used wireless service is also determined and selected. The last used wireless service is determined from information stored in the memory 112. The last used wireless transceiver may be determined implicitly based on the type and number of wireless transceiver carried by the mobile transceiver 102, or it may be stored explicitly in the memory 112. The mobile transceiver 102 may also store a last used frequency or last used frequency band associated with each wireless transceiver, depending in the wireless transceiver. While not shown, the operation 401 may be preceded by the main processor 104 waking from a low power mode.

At 402, the mobile transceiver 102 activates the selected wireless transceiver, for example from a low power mode. For example, the mobile transceiver 102 may wake up the wireless transceiver from a sleep mode. The wireless transceiver may be a cellular transceiver 114, WLAN transceiver 116 or a Bluetooth transceiver. The activating of the wireless transceiver may be caused by the expiry of a timer or other trigger, depending on the embodiment. The activating of the last wireless transceiver may be performed by the main processor 104 or the baseband processor 304, depending on the embodiment.

At 404, the wireless transceiver searches for a wireless signal for the wireless service. The wireless transceiver may search for an available wireless signal for the wireless service based on a priority sequence of frequencies stored in memory. The priority sequence may be based on preferred carriers, for example, frequencies used by the carrier of the user's home network and/or carriers that have an advantageous partnering agreement with the carrier of the user's home network. The priority sequence could be based on a last used frequency or frequency band associated with the wireless transceiver as well as or instead of frequencies associated with preferred carriers. The priority sequence may be a list of frequencies sorted or ranked in a descending order of priority based on being a preferred carrier frequency, a last used frequency or a last used frequency band. The list of frequencies may be a list of all frequencies supported by the wireless service sorted or ranked in the manner described, or a subset of the supported frequencies.

At 406, the mobile transceiver 102 determines whether the wireless service is available in accordance with any responses received in response to the scanning. When the wireless service is available, processing proceeds to 408, at which the mobile transceiver 102 selects and accesses, or connects to, the wireless service. At 410, the mobile transceiver 102 optionally updates the last used wireless service by storing identifying information about the accessed wireless service in the memory 112, for example, by updating a last used wireless service parameter stored in memory 112. A time associated with the last use, such as a time at which the wireless service was last accessed or a correction to the wireless service was last initiated, or a time at which access or correction to the wireless service was last terminated, may be stored in association with the identifying information about the accessed wireless service. The frequency or frequency band used by the wireless transceiver may also be stored in some embodiments, depending on the wireless transceiver. Alternatively, in other embodiments the updating of the last used wireless service may be omitted when the last used wireless service is available.

At 430, the mobile transceiver 102 sends at least a portion of the data log to the asset tracking service 200 using the wireless service.

When the wireless service is not available and other supported wireless services have not been checked (decision block 412), the processing proceeds to 414 at which the mobile transceiver 102 selects an alternate wireless service from a plurality of wireless services. The alternate wireless service may be selected based on one or more wireless service parameters, such as power efficiency, reliability, data throughout, bandwidth, Quality of Service (QoS) among other parameters. For example, in some embodiments the most power efficient wireless service is selected in accordance with a power profile of the wireless services stored in memory, such as the memory 112. The basic power profile information may be stored in the power profile efficiency table, an example of which is shown below.

TABLE 1

Power Profile Efficiency Table

| Wireless service | Power Efficiency Indicator |
|---|---|
| 4G LTE | Medium |
| 2G/3G | High |
| Wi-Fi | Low |
| Bluetooth | Low |

The power profile efficiency table includes the basic power profile for each wireless service supported by the mobile transceiver 102. The basic power profile includes a power efficiency indicator for each wireless service supported by the mobile transceiver. In the shown example, the power efficiency indicator is a qualitative indicator in the form of a "Low", "Medium" or "High" rating. However, other qualitative indicators could be used in other embodiments, such as a numerical rating from 1 to 10, to provided increase precision. Alternatively, a quantitative indicator could be used in other embodiments.

Depending on the wireless transceivers carried by the mobile transceiver 102, the mobile transceiver 102 may have to switch wireless transceivers based on the alternate wireless service which is selected. For example, if a separate cellular transceiver 114 for 4G LTE, 3G and 2G is carried by the mobile transceiver 102 and the wireless service that mobile transceiver 102 just searched for was 4G LTE and the alternate wireless service which was selected is 3G, the mobile transceiver 102 may sleep or power-off the 4G cellular transceiver 114 and activate the 3G cellular transceiver 114. However, when a multi-band cellular transceiver 114 supporting 4G LTE, 3G and 2G is carried by the mobile transceiver 102, the same wireless transceiver is used and no switching is required.

In some embodiments, when more than one SIM card is carried by the mobile transceiver, selecting an alternate wireless service may comprise switching, by the transceiver module, from a first SIM card to a second SIM associated with the alternate cellular service.

When the wireless service is not available and other supported wireless services have not been checked (decision block 412), or when the mobile transceiver has sent at least a portion of the data log to the asset tracking service 200, the processing proceeds to 440 at which a low power mode is initiated for the wireless transceiver and/or satellite receiver 120.

Before a low power mode is initiated for the wireless transceiver and/or satellite receiver 120, the mobile transceiver 102 may optionally perform data logging via the satellite receiver 120 until a next attempt to access wireless services, i.e., the next reporting cycle. In some embodiments, the data logging comprises determining, via the satellite receiver 120, a time and a location of the mobile transceiver 102, and storing the time and the location data in the data log stored in the memory 112. The data logging may further comprise sensing, via one or more of the sensors 130, an environment of the mobile transceiver 102, and storing the sensor data obtained via the sensors 130 and a time at which the sensor data was obtained in the data log stored in the memory 122.

Figure 5:
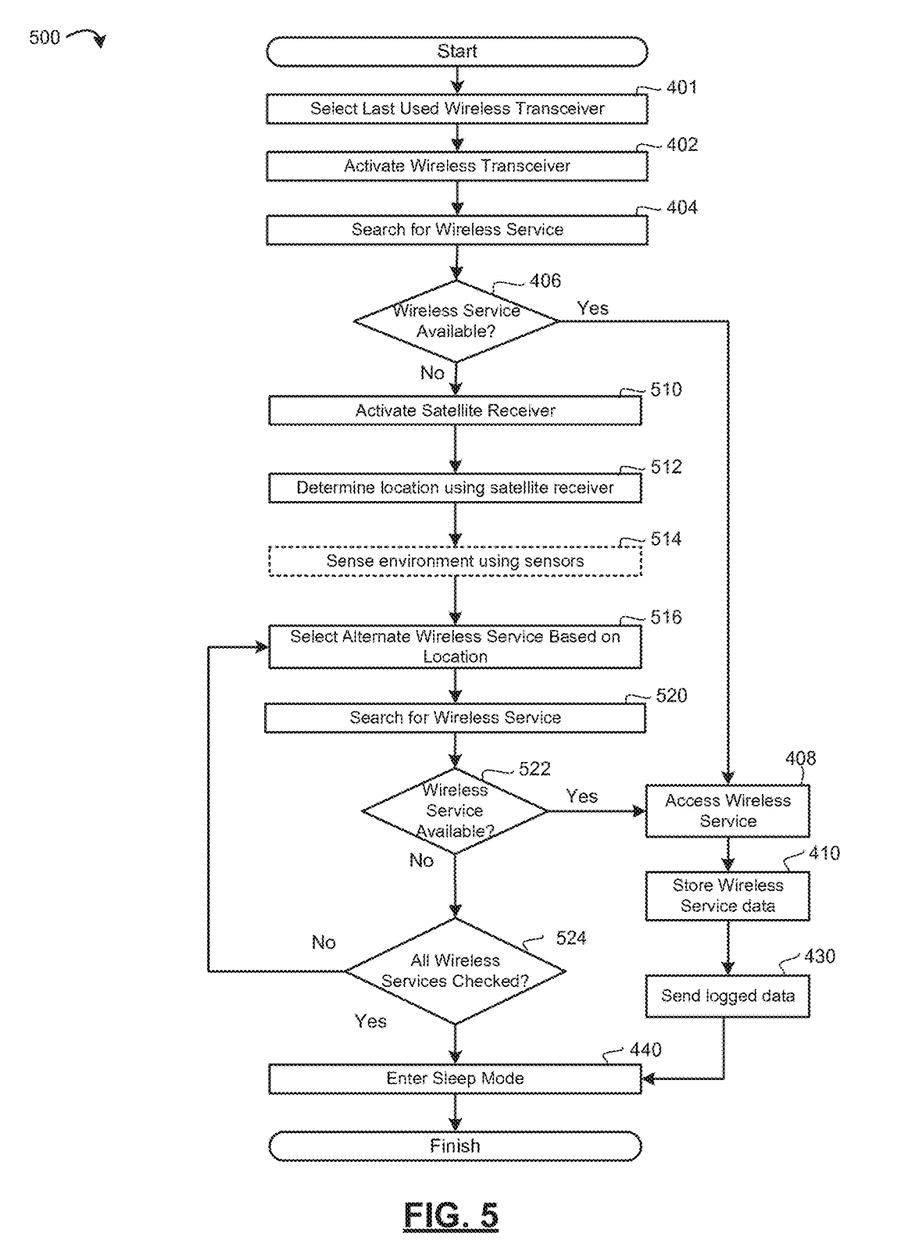
FIG. 5 is a flowchart illustrating an example embodiment of a method of operating a mobile transceiver in accordance with another embodiment of the present disclosure.

FIG. 5 shows an example flowchart of a method 500 of operating a mobile transceiver 102 such as a GNSS tracking device in accordance with another example embodiment of the present disclosure. The method may be carried out by software executed by a processor of the mobile transceiver 102. Coding of software for carrying out such a method 500 is within the scope of a person of ordinary skill in the art provided the present disclosure. The method 500 may contain additional or fewer processes than shown and/or described, and may be performed in a different order in other embodiments. Machine readable code executable by the processor to perform the method 500 may be stored in a machine readable medium such as a memory of the mobile transceiver 102.

At 401, the mobile transceiver 102 determines and selects a last used wireless service, such as a 4G LTE, 3G, 2G, or possibly WLAN or Bluetooth wireless service.

At 402, the mobile transceiver 102 activates the selected wireless transceiver, for example from a low power mode.

At 404, the wireless transceiver searches for a wireless signal for the wireless service.

At 406, the mobile transceiver 102 determines whether the wireless service is available in accordance with any responses received in response to the scanning. When the wireless service is available, processing proceeds to 408, at which the mobile transceiver 102 selects and accesses the wireless service. At 410, the mobile transceiver 102 updates the last used wireless service by storing identifying information about the accessed wireless service in the memory 112. The frequency or frequency band used by the wireless transceiver may also be stored in some embodiments, depending on the wireless transceiver.

At 430, the mobile transceiver 102 sends at least a portion of the data log to the asset tracking service 200 using the wireless service.

When the wireless service is not available (decision block 406), the processing proceeds to 510 at which the satellite receiver 120 is activated, for example, from a low power mode. This operation may be omitted in other embodiments if the satellite receiver 120 is already activated.

At 512, the mobile transceiver 102 determines its location using the satellite receiver 120. The determined location and a time associated with the determined location is stored in the data log in the memory 112.

At 514, the mobile transceiver 102 optionally senses, via one or more sensors 130, an environment of the mobile transceiver 102. The sensor data obtained via the sensors 130 and a time at which the sensor data was obtained is stored in the data log stored in the memory 112.

At 516, the mobile transceiver 102 selects an alternate wireless service from a plurality of wireless services based on the determined location. The mobile transceiver 102 has stored in memory one or more wireless service(s) for use in various locations. The mobile transceiver 102 may store a table geo-spatial locations or a range thereof and associated wireless services(s) to be used in those locations, and in some examples identifying the preferred wireless services at those locations. The geo-spatial locations may be stored in any suitable form, such as latitude and longitude ranges, regions, countries, etc. The associated wireless services(s) to be used in those locations may include a number of wireless services and a priority sequence of those wireless services. The priority sequence may be provided implicitly by the order of the wireless services, for example, the wireless services may be listed from highest to lowest in a descending order of priority.

The selection may also be based on one or more wireless service parameters, such as power efficiency, reliability, data throughout, bandwidth, Quality of Service (QoS) among other parameters, in addition to the determined location. In some embodiments, each of the parameters is assigned a priority and the wireless service is selected in accordance with the priority assigned to each parameter in the extended power profile and a multi-factor selection algorithm. In other embodiments, the wireless service is selected in accordance with a particular parameter, for example, to select the wireless service having the optimal value (e.g., highest or lowest, depending on the parameter) for the particular parameter. The particular parameter used for selecting the wireless service may be specified by the asset tracking service 200. The asset tracking service 200 may specify the parameter to be used in a message sent to and received by the asset tracking service 200. The particular parameter to be used during selection may be retrieved from the message received by the asset tracking service 200 and stored in local memory, such as the memory 112, for use in the method 400.

At 520, the wireless transceiver searches for a wireless signal for the wireless service as described above in connection with operation 404.

At 522, the mobile transceiver 102 determines whether the wireless service is available in accordance with any responses received in response to the scanning as described above in connection with operation 406.

When the wireless service is not available and other wireless services associated with the determined location have not been checked (decision block 524), or when the mobile transceiver has sent at least a portion of the data log to the asset tracking service 200, the processing proceeds to 440 at which a low power mode is initiated for the wireless transceiver and/or satellite receiver 120.

Figure 6:
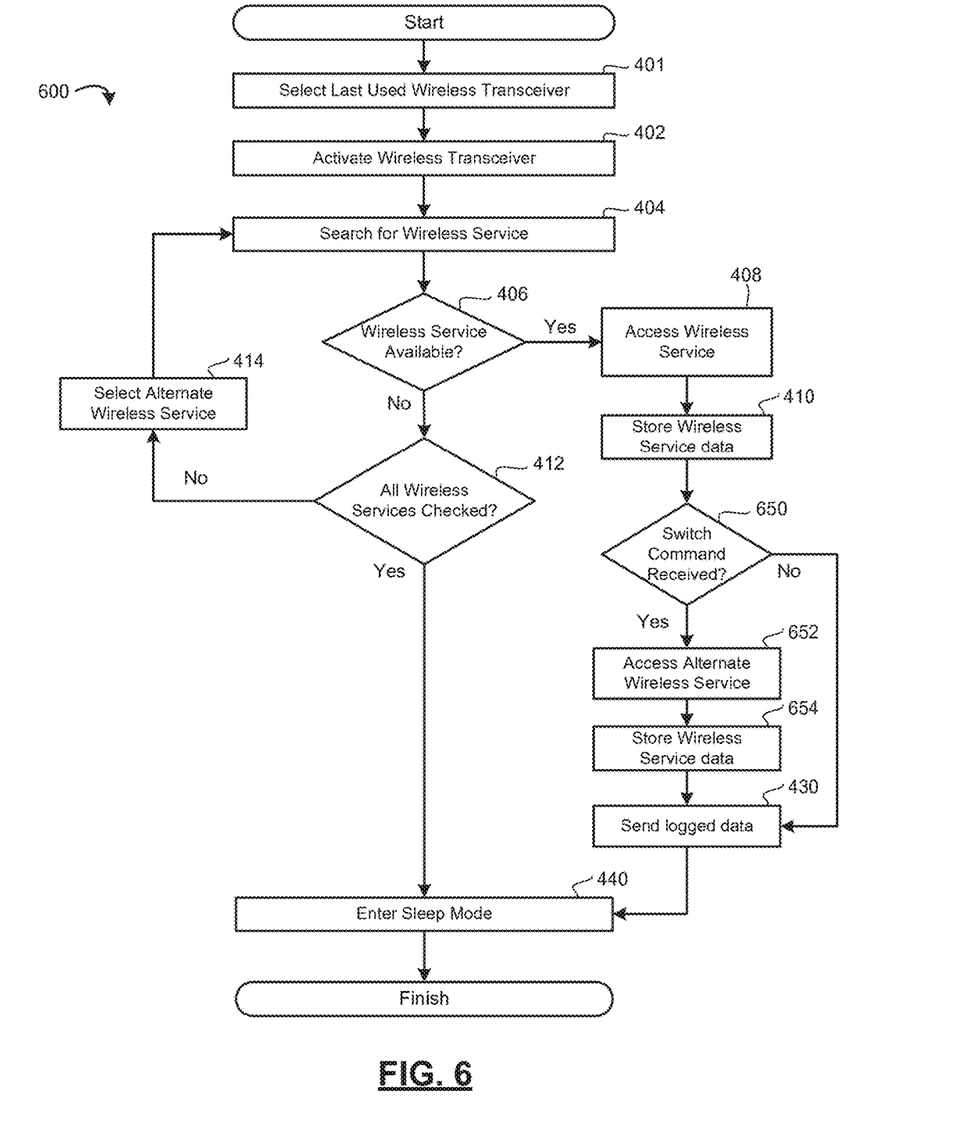
FIG. 6 is a flowchart illustrating an example embodiment of a method of operating a mobile transceiver in accordance with a further embodiment of the present disclosure.

FIG. 6 shows an example flowchart of a method 600 of operating a mobile transceiver 102 such as a GNSS tracking device in accordance with a further example embodiment of the present disclosure. The method 600 is similar to the method 400 described above with some additional operations.

At 410, the mobile transceiver 102 updates the last used wireless service by storing identifying information about the accessed wireless service in the memory 112 and optionally stores the frequency or frequency band used by the wireless transceiver, depending in the wireless transceiver.

At 650, the mobile transceiver 102 determines whether a switch command is received from the asset tracking service 200. The switch command includes an alternate wireless service to be used by the mobile transceiver 102 and an instruction to switch from the current wireless service to the alternate wireless service. The switch command may be sent by the asset tracking service 200 for a variety of reasons. The asset tracking service 200 may have information about preferred or more optimal wireless services which is not available to the mobile transceiver 102 because the mobile transceiver 102 was not provided with such information or because information provided to the mobile transceiver 102 is out of date. For example, the alternate wireless service may be preferred or more optimal because it is associated with the carrier of the user's home network and/or carriers that have an advantageous partnering agreement with the carrier of the user's home network. Alternatively, the alternate wireless service may be preferred or more optimal because it may have improved power efficiency, reliability, data throughout, bandwidth, or Quality of Service (QoS) among other parameters instead of, or in addition to, a preferred partnering agreement. The switch command from the asset tracking service 200 not only allows more current information to be used in selecting the wireless service, but also reduces power consumption on the mobile transceiver 102 by having the decision making as to the preferred or more optimal wireless service performed by the asset tracking service 200 instead of the mobile transceiver 102.

When a switch command is not received, the operations continue to 430 at which the mobile transceiver 102 sends at least a portion of the data log to the asset tracking service 200 using the previously selected wireless service, as described above.

When a switch command is received, the operations continue to 652 at which the mobile transceiver 102 selects and accesses the alternate wireless service. If the alternate wireless service is not available, the mobile transceiver 102 may select and access the wireless service previously selected and accessed in 408.

At 654, the mobile transceiver 102 updates the last used wireless service by storing identifying information about the accessed wireless service in the memory 112 and optionally stores the frequency or frequency band used by the wireless transceiver, depending on the wireless transceiver. The operations then proceed to 430 at which the mobile transceiver 102 sends at least a portion of the data log to the asset tracking service 200 using the previously selected wireless service, as described above.

Figure 7:
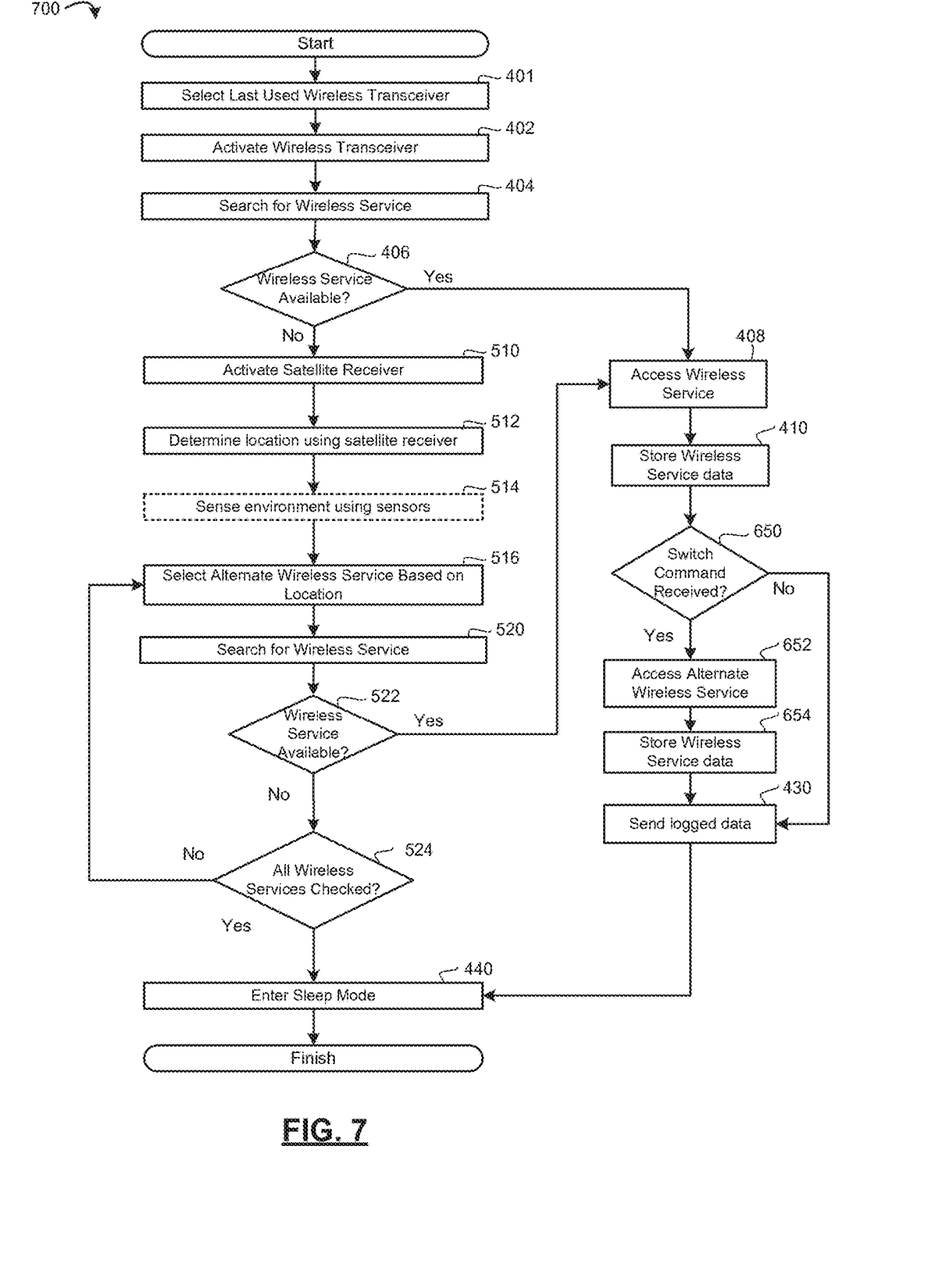
FIG. 7 is a flowchart illustrating an example embodiment of a method of operating a mobile transceiver in accordance with yet a further embodiment of the present disclosure.

FIG. 7 shows an example flowchart of a method 700 of operating a mobile transceiver 102 such as a GNSS tracking device in accordance with a further example embodiment of the present disclosure. The method 700 is similar to the method 500 described above with some additional operations. In particular, the operations 650, 652 and 654 from the method 600 (FIG. 6) are performed after the mobile transceiver 102 updates the last used wireless service by storing identifying information about the accessed wireless service in the memory 112 and optionally stores the frequency or frequency band used by the wireless transceiver, depending on the wireless transceiver.

The above-described methods provide power efficient global and long-range tracking methods that reduce power consumption and extend the expected life of the battery of the mobile transceiver. In accordance with the described embodiments, the mobile transceiver determines a last used wireless service and attempts to access the last used wireless service, thereby saving the battery power consumed by searching for all the available wireless services is conventionally done. When the last used wireless service is not available, different approaches for selecting and switching to an alternate wireless service may be taken. When the last used wireless service is available, the mobile transceiver may access the last used wireless service and receive a command from the asset tracking service to switch to an alternate wireless service which may preferred or more optimal for power related or other reasons. The above-described methods of operating a mobile transceiver are particularly advantageous when the mobile transceiver is provided with a non-rechargeable battery. The above-described methods of operating a mobile transceiver are also particularly advantageous when a period of time has elapsed since the mobile transceiver determined its location using the satellite receiver, for example, when the mobile transceiver wakes up after a period of inactivity in which at least the satellite receiver and wireless transceiver were in a low power mode.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver, comprising:
    activating a wireless transceiver for use with a last used wireless service from a plurality of a wireless services supported by the mobile transceiver in response to waking up the wireless transceiver from a low power mode, wherein the plurality of wireless services supported by the mobile transceiver comprise at least two of 4G Long-Term Evolution (LTE), 3rd Generation Partnership Project (3GPP) cellular, 3G and 2G wireless service;
    searching for a wireless signal of the last used wireless service;
    when the last wireless service is available, accessing the last used wireless service; and
    when the last used wireless service is not available, selecting an alternate wireless service from a plurality of wireless services, accessing the alternate wireless service, and updating a last used wireless service in memory in response to accessing the alternate wireless service.

2. The method of claim 1, wherein the plurality of wireless services supported by the mobile transceiver further comprises WLAN and Bluetooth wireless services.

3. The method of claim 1, further comprising:
    when the last used wireless service is not available, determining via a satellite receiver a location of the mobile transceiver;
    wherein the alternate wireless service is selected in accordance with stored information identifying which of the plurality of wireless services may be available at the determined location.

4. The method of claim 1, wherein the alternate wireless service is selected from the plurality of wireless services in accordance with one or more selection parameters stored in memory and the determined location.

5. The method of claim 1, further comprising, before determining the location of the mobile transceiver, activating the satellite receiver from a low power mode.

6. The method of claim 1, further comprising:
    storing the determined location and a time associated with the determined location in the data log stored in the memory;

sensing, via one or more sensors, an environment of the mobile transceiver; and storing sensor data obtained via the sensors and a time at which the sensor data was obtained in the data log stored in the memory.

7. The method of claim 1, further comprising:
switching to an alternate wireless service specified by a switch command when a switch command is received from an asset tracking service.

8. The method of claim 1, wherein the alternate wireless service is selected from a plurality of wireless services in accordance with one or more selection parameters stored in memory.

9. The method of claim 1, further comprising searching for a wireless signal for the alternate wireless service, wherein the alternate wireless service is accessed when the alternate wireless service is available.

10. The method of claim 1, further comprising:
when no wireless service is available, performing a data logging cycle via one or both of a satellite receiver and a plurality of environmental sensors, and initiating a low power mode for the satellite receiver and/or the plurality of environmental sensors after completion of the data logging cycle.

11. The method of claim 1, further comprising:
when no wireless service is available, initiating a low power mode for the wireless transceiver.

12. The method of claim 1, further comprising:
initiating a low power mode for the wireless transceiver, after sending at least a portion of the data log to an asset tracking service.

13. A mobile transceiver, comprising:
a processor;
a memory coupled to the processor;
a satellite receiver coupled to the processor; and
a wireless transceiver coupled to the processor;
wherein the processor is configured for:
activating a wireless transceiver for use with a last used wireless service in a plurality of a wireless services supported by the mobile transceiver in response to waking up the wireless transceiver from a low power mode, wherein the plurality of wireless services supported by the mobile transceiver comprise at least two of 4G Long-Term Evolution (LTE), 3rd Generation Partnership Project (3GPP) cellular, 3G and 2G wireless service;
causing the wireless transceiver to search for a wireless signal of the last used wireless service;
when the last wireless service is available, accessing the last used wireless service; and
when the last used wireless service is not available, selecting an alternate wireless service from a plurality of wireless services, accessing the alternate wireless service, and updating a last used wireless service in memory in response to accessing the alternate wireless service.

14. The mobile transceiver of claim 13, wherein the plurality of wireless services supported by the mobile transceiver further comprises WLAN and Bluetooth wireless services.

15. The mobile transceiver of claim 13, wherein the processor is further configured for:
when the last used wireless service is not available, determining via a satellite receiver a location of the mobile transceiver;
wherein the alternate wireless service is selected from the plurality of wireless services in accordance with the determined location.

16. The mobile transceiver of claim 13, wherein the processor is further configured for:
switching to an alternate wireless service specified by a switch command when a switch command is received from an asset tracking service.

17. The mobile transceiver of claim 13, wherein the mobile transceiver is a Global Navigation Satellite System (GNSS) tracking device.

18. A non-transitory machine readable medium having tangibly stored thereon executable instructions that, when executed by a processor of a mobile transceiver, the mobile transceiver comprising a processor, a memory, a satellite receiver, and a wireless transceiver, cause the processor to:
activating a wireless transceiver for use with a last used wireless service in a plurality of a wireless services supported by the mobile transceiver in response to waking up the wireless transceiver from a low power mode, wherein the plurality of wireless services supported by the mobile transceiver comprise at least two of 4G Long-Term Evolution (LTE), 3rd Generation Partnership Project (3GPP) cellular, 3G and 2G wireless service;
causing the wireless transceiver to search for a wireless signal of the last used wireless service;
when the last wireless service is available, accessing the last used wireless service; and
when the last used wireless service is not available, selecting an alternate wireless service from a plurality of wireless services, accessing the alternate wireless service, and updating a last used wireless service in memory in response to accessing the alternate wireless service.

* * * * *